United States Patent [19]
Wolf et al.

[11] 3,974,595
[45] Aug. 17, 1976

[54] GEAR GRINDING MACHINE FOR SPIRAL BEVEL GEARS

[75] Inventors: Albin Wolf, Augsburg; Franz Weigant, Kissing, near Augsburg, both of Germany

[73] Assignee: Fa. Zahnraderfabrik Renk AG, Augsburg, Germany

[22] Filed: Jan. 31, 1975

[21] Appl. No.: 546,037

[30] Foreign Application Priority Data
July 12, 1974 Germany.............................. 2433603

[52] U.S. Cl................................... 51/5 D; 51/31; 51/52 R; 51/54
[51] Int. Cl.² .......................................... B24B 9/00
[58] Field of Search ................... 51/5 D, 31, 32, 54, 51/287, 52 R

[56] References Cited
UNITED STATES PATENTS
| | | | |
|---|---|---|---|
| 1,324,475 | 12/1919 | Stewart | 51/52 R UX |
| 1,351,580 | 8/1920 | Maag | 51/52 R X |
| 1,964,233 | 6/1934 | Uhlich | 51/52 R X |

*Primary Examiner*—Harold D. Whitehead
*Assistant Examiner*—Gary L. Smith
*Attorney, Agent, or Firm*—Karl F. Ross; Herbert Dubno

[57] ABSTRACT

A gear grinding machine for forming spiral bevel gear teeth grinds a curved flank of a tooth in a continuously rotating bevel gear wheel. A slider carrying a grinding disk is adjustably guided on a slide reciprocating along the flank of a tooth at right angles to a guiderail along a path exceeding the maximum length of one of the teeth. The grinding disk is formed as a truncated cone, its frustoconical surface being used for grinding. It is attached to a shaft in a normal or a 180° reversed position and can be positioned along the shaft toward a flank of a tooth. The slide guide rail is disposed on a rocker oscillating in dependence on the desired curvature of a tooth and a motor attached to the sled drives the shaft via a flat belt.

9 Claims, 6 Drawing Figures

GEAR GRINDING MACHINE FOR SPIRAL BEVEL GEARS

FIELD OF THE INVENTION

Our present invention relates to a machine for cutting spiral bevel gears. More particularly this invention concerns a gear tooth grinder.

BACKGROUND OF THE INVENTION

Various methods and processes have been disclosed for the manufacture of spiral bevel gears or bevel gear wheels having curved tooth flanks. In one arrangement a grinding disk formed as a truncated cone is made to oscillate longitudinally along the tooth flanks, the disk trajectory being the vectoral sum of several motion components. An arrangement of this type is very complicated and does not permit the manufacture of bevel gears having large diameters. In another arrangement the bevel gear wheel is rotated around its own axis while it is oscillated about an axis perpendicular to a conical surface line thereof, the grinding tool meanwhile rotating about a fixed axis. This latter arrangement is even more unsuitable for the manufacture of large bevel gears as a result of the required acceleration of large masses, eventually resulting in a considerable loss of accuracy during operation.

OBJECTS OF THE INVENTION

It is therefore an object of the present invention to provide an improved apparatus for machining the teeth of a bevel gear or of a hypoid or spiral-type bevel gear.

Another object is the provision of a gear-grinding machine capable of accurately grinding teeth of very large bevel gears, of a diameter of two meters and more.

Yet another object is the provision of such an apparatus for cutting spur-type teeth with curved flanks in a bevel gear.

SUMMARY OF THE INVENTION

Our invention takes as its starting point the operation of a known gear forming machine where a guide carrying a tool is adjustably guided on a slide reciprocating along a flank of a tooth of a continuously rotating bevel gear wheel in a direction at right angles to the travel of the slide guide along a path exceeding the maximum length of a tooth, and where the slide guide is disposed on a rocker oscillating in dependence on the desired curvature of the flank of the tooth.

According to our invention the grinding tool of a machine of the above type is formed as a truncated cone attachable to a driving shaft in either a normal or 180° reversed position, its conical surface being used as a grinding surface. The shaft is in turn driven by a motor disposed on the side via a flat belt drive.

The previously cited tooth-forming machine of the Gleason type is, however, only able to impart the desired shape to a tooth by means of a planing tool. The bevel gear wheel is continuously rotated about its own axis as the planing tool is guided along the flank of the tooth to be formed. Since the planing tool cannot travel backwards, it must be disengaged from the tooth at a time it has just passed its end. This is accomplished by guiding a slider receiving the planing tool in a slide reciprocating at a right angle to the plane of motion of the slide, the planing tool thereby executing a rectangular motion. The slide is guided on a rocker oscillating during the planing of the flank of the tooth, the vectoral sum of all motions resulting in a curved flank line.

Forming a curved flank of a tooth by grinding, rather than planing has not, however, been known hitherto and is now made possible as a result of our invention. The grinding disk attached to the slider and shaped in the form of a truncated cone is guided, just as the planing tool, along the flank of a tooth, while the workpiece is continuously rotating and the rocker oscillating. It has proven rather difficult, however, to attach the grinder according to our invention to the slide, as well as to drive and move it within a relatively small space so as to achieve an exact grinding process.

This is accomplished as a result of using the conical surface of a truncated cone as a grinding disk, and positioning it along its axis against the workpiece. It is additionally possible to grind the opposite flank of a tooth of a workpiece by reversing the grinding disk by 180° around an axis perpendicular to the disk axis of rotation and coincident with one of its largest diameters. Grinding thus becomes a continuous process, the diameter of the grinding disk remaining constant, thereby also ensuring a constant grinding velocity. The degree of longitudinal curvature can be controlled or set when grinding flanks of the teeth, so that it is possible, according to our invention, to grind case-hardened bevel gear wheels of a diameter of the order of 2 meters and greater. This permits the obtention of greater peripheral velocities for large bevel gear wheels and a reduction of noise when the gears are used.

Since the grinding disk does not assume a fixed position as a result of the motion of the slider and its travel toward the flank of the tooth, it is necessary to have a drive which follows such a motion. The cited flat-belt drive is very suitable in this respect, the component of motion arising out of the travel of the grinding disk toward a flank of the tooth being accommodated by making the belt-receiving pulley attached to the grinding disk bowl-shaped or generally spherical. This permits a relative movement of the flat belt along the peripheral surface of the belt-receiving roll without the drive thereof being impaired. A pivoted tensioning roller is urged into contact with the belt by means of a compression spring, so that an appropriate tension is maintained in the belt during a stroke of the slider.

To permit engagement of the driving disk with the flank of a tooth, a worm gear train, adjustable via a bevel-gear train, is disposed on the slider according to our invention, its gear wheel engaging a shaft support formed with an inner thread. A locking device is provided preventing rotation of the shaft support when the latter has reached a desired position.

A truing device attached to the slide and drivably adjustable along a conical surface line of the grinding disk is also included in our invention. The truing device is preferably pivotable about an axis perpendicular to the plane of motion of the slide and can be held in a selected position by means of a curved elongated slot formed in the mounting plate. The grinding device is further provided with a holder carrying two diamonds on its ends and adjustable in a direction at right angles to a conical surface line of the grinding disk.

By means of this truing device it is possible to grind or sharpen the grinding disk along its conical surface by a simple reciprocation of the truing diamonds irrespective of the position of the grinding disk on its shaft, all other movements of the machine or parts thereof being stopped. Since the truing device is pivotable about the previously-described axis it can accomodate any position of the conical surface of the truing disk. The truing device must not, however, interfere with the motion of the slider during the grinding of a bevel gear wheel, for which reason it can be returned to a position beyond the travel of the slider.

Our invention also provides for a mounting plate carrying the truing device to be pivotably adjustable about an axis at right angles to the shaft of the grinding disk and passing through the largest diameter thereof.

BRIEF DESCRIPTION OF THE DRAWING

The above and other objects, features, and advantages will become more readily apparent from the following, with reference to the accompanying drawing in which.

SPECIFIC DESCRIPTION

Figure 1:
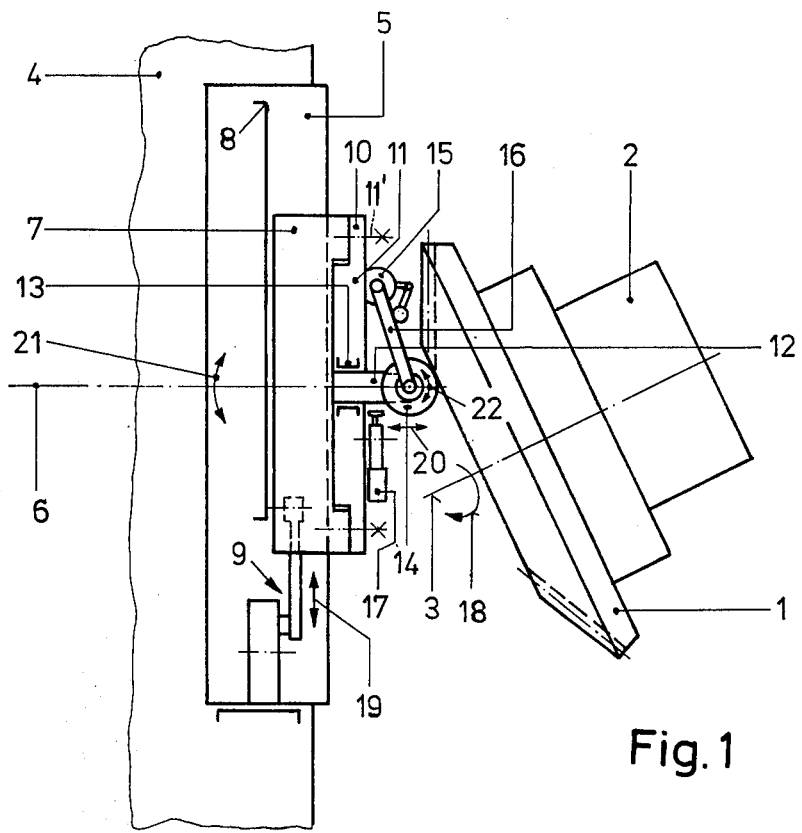
FIG. 1 is a schematic plan view of the bevel-gear grinding machine according to this invention.

In FIG. 1 there is shown an overall arrangement of a gear-cutting machine 4 provided with a grinding means which illustrates the various overlapping individual motions of various parts of the machine. A bevel gear 1 to be toothed is rotatably supported in a bevel gear-wheel support 2 which is attached to the frame of the machine and which rotates the gear 1 about an inclined axis 3. A rocker 5 capable of oscillating about a horizontal axis 6 is attached to gear-forming machine 4 and is provided with a slider guide 8 extending parallel to the tooth to be cut in the bevel gear wheel 1. A slide 7 guided therein is reciprocated by a crank drive 9 carried on the rocker 5. A plate 11 is attached to the slide 7 via bolts 11' passing through a flange 10 and serves as a mounting plate for the grinder. A slider 12 is guidable on the latter at right angles to the plane of motion of the slide 7, that is in a direction perpendicular to the plane of the view in FIG. 1 with the aid of a slider guide 13 supporting a shaft 26 (FIG. 3) for a grinding disk 14. A drive motor 15 mounted on the mounting plate 11 drives the shaft 26 of grinding disk 14 via a belt 16. The mounting plate 11 also carries a device 17 for truing the disk 14.

Figure 2:
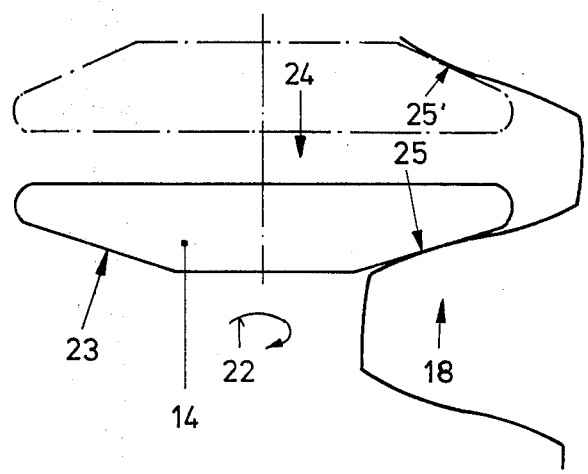
FIG. 2 is a longitudinal section through the grinding disk.

As shown in FIG. 2, the grinding disk 14 has the shape of a truncated cone, its frustoconical surface 23 operating on a flank 25 of a gear tooth as the disk is rotated as shown by arrow 22. If the grinding disk 14 is reversed by 180° on its axle, a flank 25' of the tooth opposite the flank 25 can be ground.

The machine functions as follows:

Bevel gear wheel 1 rotates continuously around its drive axis 3 in the direction of arrow 18. The slide 7 reciprocates in the directions of arrow 19, so that the grinding disk 14, rotating for example in either one of the directions of arrow 22, can cover the entire length of a flank of a tooth. As soon as a stroke of the slide 7 passes upward beyond the bevel gear wheel 1, the slider 12 is moved inward by displacement of the machine 4 in the direction of arrow 20 toward the slide guide 8 until the grinding disk 14 is disengaged from between the teeth formed in the bevel gear 1, the slide 7 thereupon returning to its starting position. Concurrently with the sliding motion along either direction of the arrow 19 the rocker 5 oscillates around an axis 6 as indicated by arrow 21. This oscillating movement creates the curvature of flanks 25 and 25'. FIG. 2 also shows an approaching motion of grinding disk 14 along the direction of arrow 24 toward the flank 25 of a tooth for setting the depth of the grinding operation, and, as will be seen later, for positioning grinding disk 14 for sharpening.

Figure 3:
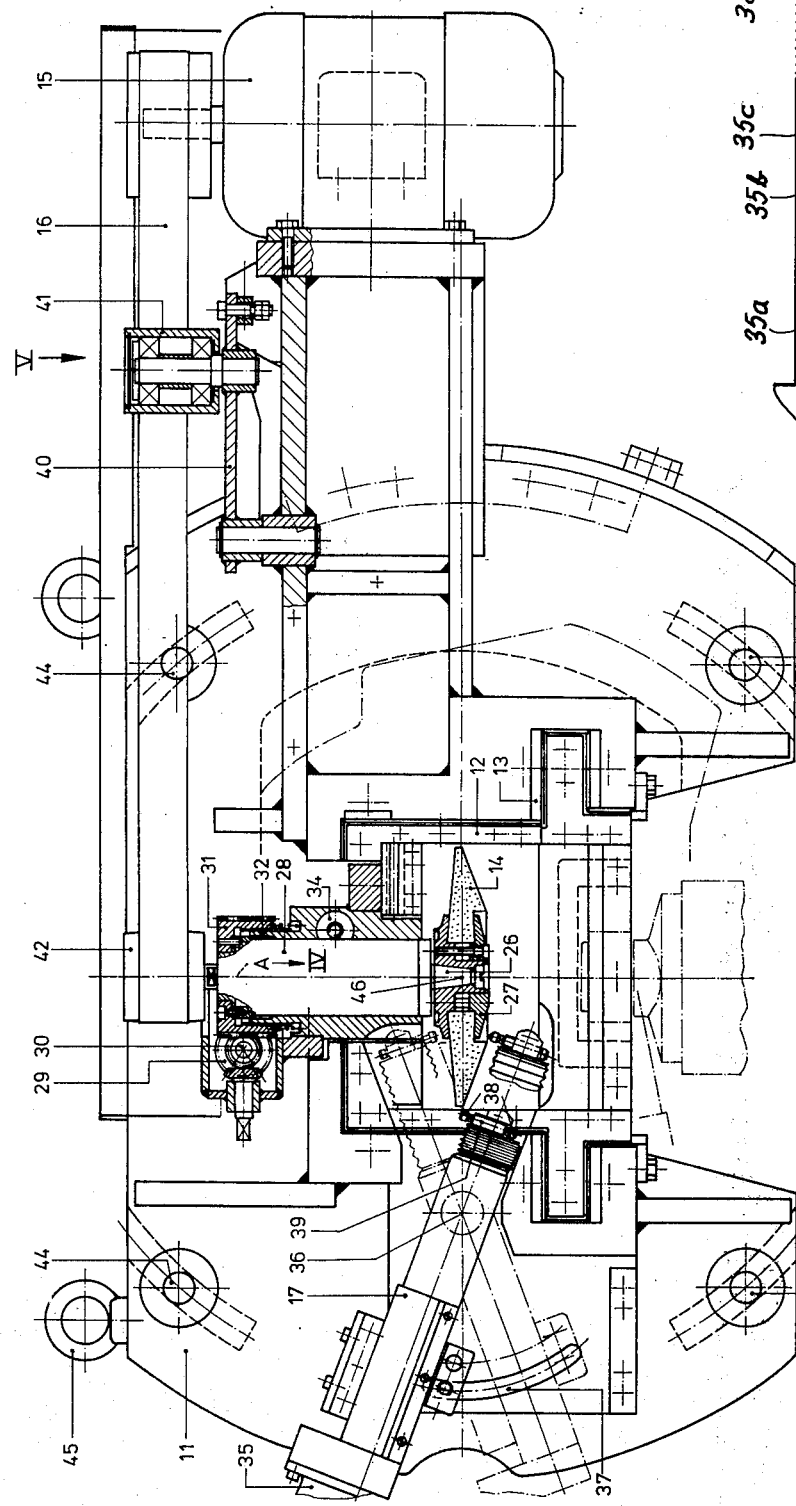
FIG. 3 is a front view in partial section of the grinding arrangement attached to a mounting plate.
Figure 4:
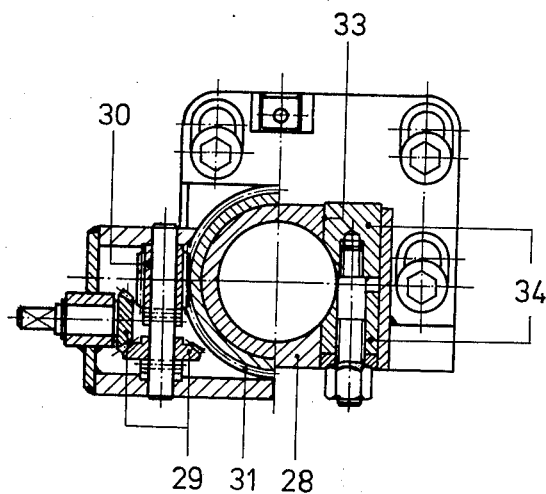
FIG. 4 is a cross-section in the direction of arrow IV of FIG. 3.
Figure 5:
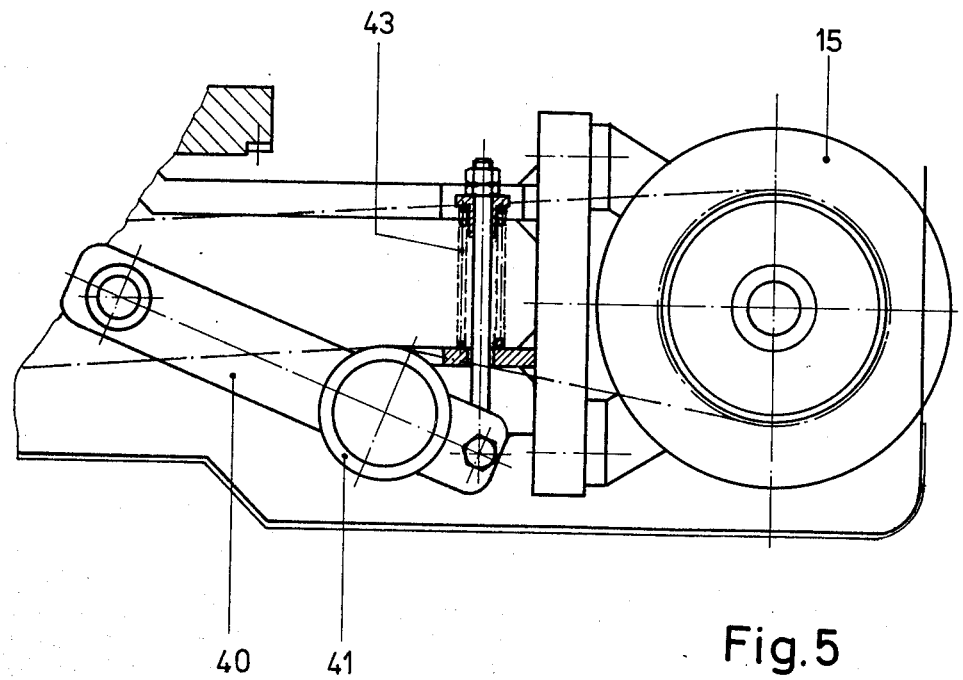
FIG. 5 is a plan view of the drive of the grinding shaft in the direction of arrow V of FIG. 3.

The grinding disk 14, as can be seen from FIG. 3, is attached to the shaft 26 by means of a locking element 27 and can be removed therefrom and reattached thereto in a position reversed by 180° around an axis passing through it at its diameter. Translation motion of the grinding disk 14 attached to the shaft 26 is effected by a shaft support or bearing 28 which is axially displaceable by a bevel gear wheel 29 acting through gears 30 and 31, as shown in FIGS. 3 and 4. The gear wheel 31 has on its inner end a screw thread 32 by means of which the shaft bearing 28 is axially movable. This bearing 28 can be clamped in any position by a locking device 33 tightened by a bolt 34. A flat belt 16 drives a pulley 42 attached to the shaft 26, and formed with a rounded or bowl-shaped peripheral surface. A belt tightener is formed by an equalizing roller 41 supported in a rocking arm 40 and a spring 43 acting thereagainst. The grinding disk 14 is driven by the belt 16 regardless of its axial position. Thus the wheel 14 and its drive pulley 42 follow a short translational motion due to the motion of slider 12 whose guide is shown only schematically in FIG. 3, when disengaging grinding disk 14 from any toothing formed in bevel gear wheel 1 during the return movement of the slide 7. The belt 16 also allows for an approach motion of the grinding disk 14 in the direction of a flank of a tooth. It is for these reasons that belt-receiving wheel 42 is generally spherical, permitting a movement of flat belt 16 relative to its peripheral surface.

Figure 6:
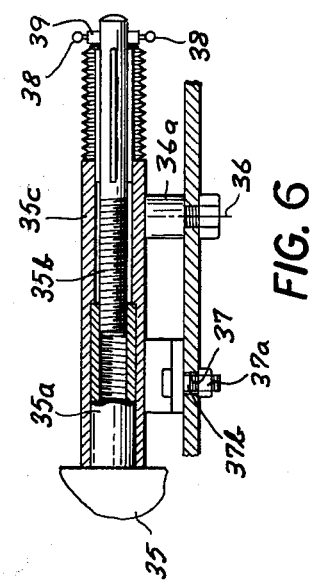
FIG. 6 is a longitudinal section through the truing device.

The truing device 17 shown in FIGS. 3 and 6 has a drive motor 35 whose shaft is constituted as an internally threaded sleeve 35a in which is received a threaded and splined rod 35b whose splines prevent it from rotating relative to the housing 35c. Thus the motor 35 can reciprocate truing diamonds 38 carried in a holder 39 at the end of the rod 35b. In use one of the diamonds is passed slowly over the rapidly rotating disk 14 to shape its surface as a frustocone centered on the rotation axis of the disk. In addition the device 17 is pivotal about a vertical axis 36 passing through a plane P orthogonal to the rotation axis A of the disk 14 at an axis 46 in the center of this disk 14. A part-circular slot 37 is formed in the housing 11 and a nut 37a on a pin 37b on the sleeve 35c allow the assembly 17 to be swung about the axis 36 defined by a pin 36a also carried on the housing 35c of the device and locked with respect to the housing 11. Thus it is possible for the truing stones 38 to face either the front or rear surface of the disk, as shown in solid and dot-dash lines, respectively, in FIG. 3.

The mounting plate 11 is pivotable about the axis 46 of the machine and is attached in any desired angular position to the slide 7, not shown in FIG. 3, by means of locking nuts 44. The axis 46 lies in the plane P of one of the largest diameters of grinding disk 14 and passes through the intersection thereof with the axis of shaft 26, the pivoting axis 36 of grinding device 17 lying in the same plane. By pivotably adjusting mounting plate 11 around axis 46, various spiral angles can be obtained in the teeth formed in bevel gear wheel 1.

We claim:

1. In an apparatus for grinding the curved flanks of gear teeth of a bevel gear having means to continuously rotate the gear and means to reciprocate a slider carrying a grinding tool the full length and beyond each tooth while means to oscillatingly rock the slider so as to impart the desired curve to the tooth, the improvement comprising:

mounting means for releasably securing said grinding tool on said apparatus in either of a pair of 180° reversed positions, said tool being a rotatable grinding wheel having at least one frustoconical grinding face engageable with a tooth flank and rotatable about an axis;

means for displacing said wheel along said axis and securing same at any desired position therealong; and drive means for rotating said grinding wheel including a drive motor carried on said slider, a pulley fixed to said wheel and rotatable about said axis, and a flat belt extending between said motor and said pulley.

2. The improvement defined in claim 1 wherein said pulley has a generally spherical peripheral surface engaged by said belt.

3. The improvement defined in claim 2, further comprising a belt tightener mounted on said slider and having a tightening element and a spring urging said tightening element against said belt.

4. The improvement defined in claim 1 wherein said means for displacing includes a wormgear drive for axially displacing said tool and a clamp for preventing axial displacement of said tool.

5. The improvement defined in claim 4 wherein said wormgear drive includes a shaft lying on said axis and carrying said shaft and formed with a thread, and an internally threaded element engaging said worm gear.

6. The improvement defined in claim 1, further comprising truing means on said slider having a truing stone displaceable over said frustoconical surface of said wheel.

7. The improvement defined in claim 6 wherein said truing means includes a support carrying said stone and adapted for straight-line displacement thereof, a pivot on said support defining a pivot axis therefor perpendicular to the displacement direction of said slider, and a guide comprising a part-circular slot formed in said slider and centered on said pivot axis and lock means for securing said support in said slot.

8. The improvement defined in claim 7 wherein said support has a holder carrying a pair of such stones.

9. The improvement defined in claim 1 wherein said apparatus includes a support limitedly pivotal about an axis perpendicular to the rotation axis of the tool and passing through said tool, said slider being mounted on said support.

* * * * *